United States Patent [19]

Baughman et al.

[11] Patent Number: 4,768,843
[45] Date of Patent: Sep. 6, 1988

[54] VEHICLE BRAKE CONTROL SYSTEM

[75] Inventors: Scott A. Baughman, Centerville; Donald M. Flory, Arcanum; Timothy A. Haerr, Enon; Donald L. Parker, Middletown; Thomas B. Taylor, Centerville; George N. Villec, Miamisburg, all of Ohio

[73] Assignee: General Motors Corporation, Detroit, Mich.

[21] Appl. No.: 32,888

[22] Filed: Mar. 31, 1987

[51] Int. Cl.⁴ .................... B60T 13/68; B60T 8/34
[52] U.S. Cl. ................... 303/119; 303/113; 303/116; 303/110; 303/DIG. 4; 180/197; 137/625.66
[58] Field of Search .................. 180/197; 188/181 A; 303/84 A, 84 R, 92, 100, 110, 111, 113, 114, 116, 119, DIG. 4; 137/625.66, 901

[56] References Cited

U.S. PATENT DOCUMENTS

| | | | |
|---|---|---|---|
| 3,606,488 | 1/1970 | Beuchle et al. | 303/114 |
| 4,050,748 | 9/1977 | Belart | 303/119 X |
| 4,357,054 | 11/1982 | Leiber | 303/114 |
| 4,492,413 | 1/1985 | Belart et al. | 303/119 X |
| 4,509,802 | 4/1985 | Solleder et al. | 180/197 X |
| 4,557,528 | 12/1985 | Leiber | 303/92 X |
| 4,641,895 | 2/1987 | Belart et al. | 180/197 X |
| 4,685,747 | 8/1987 | Belart et al. | 303/119 X |
| 4,685,749 | 8/1987 | Otsuki et al. | 303/119 X |
| 4,687,260 | 8/1987 | Matsui et al. | 303/119 |
| 4,715,663 | 12/1987 | Hattori et al. | 303/116 X |

FOREIGN PATENT DOCUMENTS

| | | | |
|---|---|---|---|
| 2443260 | 3/1975 | Fed. Rep. of Germany | 130/197 |
| 3439258 | 4/1986 | Fed. Rep. of Germany | 303/116 |
| 2178499 | 2/1987 | United Kingdom | 303/116 |

Primary Examiner—Andres Kashnikow
Assistant Examiner—Timothy Newholm
Attorney, Agent, or Firm—D. D. McGraw

[57] ABSTRACT

A vehicle braking system having a wheel lock control arrangement with isolation valves for each wheel brake and either three or four solenoid and brake control valves for the system. In one arrangement, each wheel brake and isolation valve has its own solenoid and control valve. In other arrangements two front wheel brakes have separate solenoid controlled operating valves and the two rear wheel brakes have a single solenoid controlling operating valve controlling both isolation valves. Traction control is incorporated into the system so that a wheel brake required braking for traction control purposes may be applied by pump pressure without the vehicle brakes themselves having to be applied through service braking.

7 Claims, 4 Drawing Sheets

VEHICLE BRAKE CONTROL SYSTEM

The invention relates to a control system for vehicle brakes, and more particularly to one which controls wheel lock to prevent or minimize vehicle wheel skid under various circumstances. It also relates to a system of that type which also applies the wheel brake to an appropriate wheel to obtain greater traction under some conditions wherein power is being applied to the driven wheel and one of the wheels is slipping.

A feature of the invention is the provision of a wheel lock control system which may be adapted to or readily added onto a standard production booster and master cylinder of the type in common use for some years. In a vehicle brake system having such a master cylinder, it is common to have a pair of brake pressurizing circuits, one of which is pressurized by each of two pressurizing pistons in the master cylinder. In some instances the circuits are split so that one circuit pressurizes the front brakes and the other circuit pressurizes the rear brakes. In other systems a diagonal split is used in which one circuit pressurizes the left front wheel and right rear wheel, and the other circuit pressurizes the right front wheel and left rear wheel. The latter system is particularly common in front wheel drive vehicles. Whether the vehicle be front-wheel drive or rear-wheel drive, it is common to have the axle set for driven wheels actuated through a differential mechanism. When wheels are so driven, it sometimes occurs that, upon power being applied to the wheels, one of the wheels is on a lower coefficient surface than the other wheel so that the wheel with a lesser coefficient tends to be rotationally driven while the other wheel is not. This results in little or no tractive force to the ground. It is therefore advantageous under such circumstances to apply the vehicle brake to the rotating wheel, which is merely slipping on the road surface, so that power may then be transferred to the non-rotating wheel and the vehicle more easily driven away from the location at which such slip is occurring. One aspect of the invention is the provision of an arrangement whereby traction brake actuating pressure is provided without the application of the vehicle brake pedal to enable the selection of the appropriate wheel brake and the application thereof in order to obtain better road traction as above described.

It is another feature of the invention to provide the system with an arrangement whereby the hydraulic pressure pump which generates pressure to be used during wheel lock control and traction control operations must be operative and producing pressure before the wheel lock control system will either release service brake pressure or attempt to apply traction brake pressure under traction requirement conditions.

The system embodying the invention has a pressure equalizer valve which equalizes pressure in the pump pressurizing circuit with the pressure, if any, in one of the service brake pressurizing circuits from the master cylinder. Isolation valves are provided for each wheel brake adjacent the wheel brake and are controlled by three-position solenoid valves operated by a wheel lock control system having appropriate algorithms for operation thereof as is generally known in the art and which have been more specifically developed for systems of the type disclosed and claimed but form no part of the invention herein claimed. It is also a feature of one of the systems disclosed and claimed embodied in the invention to utilize such solenoid operated valves at each wheel, and in another arrangement disclosed and claimed to utilize separate solenoid operated valves for the two front wheels and a single solenoid operated valve to control the isolation valves for both of the rear wheels. It is a feature of the invention to provide these arrangements in diagonal split brake systems.

All of the systems illustrated in FIGS. 1, 2, 3 and 4 are shown as being connected to a typical power brake system in common use including a master cylinder 10 actuated by a brake booster 12 through appropriate linkage such as a brake pedal, not shown, which actuates push rod 14. The master cylinder 10 is of the type having a reservoir 16 and a pressurizing section 18 which, as is well known in the art, may contain two pressurizing chambers, each chamber being connected to a separate wheel brake actuating circuit. In this particular instance, pressurizing chambers within the pressurizing section 18 have outlets 20 and 22 respectively connected to a first wheel brake pressurizing circuit 24 and a second wheel brake pressurizing circuit 26. Each circuit includes appropriate conduits and passages ultimately leading to the wheel brakes of that circuit. The first circuit 24 has included therein or connected thereto the left front wheel brake 28 and the right rear wheel brake 30. The left front wheel brake is provided with an isolation valve 32 and a solenoid operated valve 34, also identified on the drawing as solenoid and valve No. 1. The main brake line 36 of the first circuit 24 is connected to isolation valve 32 and is also connected to isolation valve 38 associated with the rear right wheel brake 30. Another solenoid and valve assembly 40 is also associated with the rear right wheel brake 30. The fluid connection arrangements with regard to the isolation valves and the solenoid valves in circuit 24 are substantially identical. They will be further described below in greater detail in relation to a typical isolation valve and solenoid valve.

The second circuit 26 includes the right front wheel brake 42 and the left rear wheel brake 44. Wheel brake 42 has associated therewith an isolation valve 46 and a solenoid and valve assembly 48, also identified on the drawings as solenoid and valve No. 2. The left rear wheel brake 44 has a similar isolation valve 50 and solenoid and valve assembly 52, also identified on the drawing as solenoid and valve No. 3, associated therewith. Solenoid and valve assembly 48 is schematically illustrated with parts broken away and in section and the valve passage 54 therethrough is illustrated in the normal service brake operating position in full section. Passage 54 is illustrated by dashed lines in the closed position 56, which is the position of the valve with the solenoid connected therewith operated to move the valve to that first energized position, and another position 58 in which passage 54 connects different portions of the fluid circuitry from the normal service brake position. It is to be understood that solenoid and valve assemblies Nos. 1, 2, 3 and 4 are similarly constructed and operable so that the valve portions thereof may assume any of the three positions illustrated with regard to solenoid and valve assembly No. 2.

The second vehicle brake circuit 26 has its main brake pressure line 60 connected to isolation valve 46 and also to isolation valve 50 in a manner like that of the first brake circuit main line 36. Main brake pressure line 60 is also connected, in parallel with the two isolation valves, to a pressure equalizing valve assembly 62 to be further described.

A pump brake fluid pressurizing circuit identified generally as pump circuit 64, includes a pump and motor assembly 66 which has a pump inlet 68 connected by a suitable passage 70 to a reservoir, which may the reservoir 16 of the master cylinder assembly or may be a separate reservoir. It is here noted that another passage 72 connects the pressure equalizing valve assembly 62 with passage 70 and therefore to the reservoir. The pump outlet 74 is connected through a pressure sensor 76, which may either sense pump output pressure or may be a flow sensor sensing the flow of fluid therethrough from the pump, but is hereinafter referred to as a pressure sensor. It is to be understood that in the further description, as well as in the claims where this pressure sensor is referred to, it may instead be a fluid flow switch sensing the output flow of brake fluid from pump 66. The pump output fluid from output passage 78, after passing through or being exposed to the pressure sensor 76, is then connected to the pump circuit main line 80. This circuit has branches connected to each of the isolation valves and to the pressure equalizing valve. More specifically, branch 82 is connected to the pressure equalizing valve assembly 62, which includes a valve piston 84 exposed on one end thereof to any pressure in brake circuit line 60, and a valve seat 86 through which pump circuit branch 82 is connected. A check valve 88 is positioned in a valve chamber 90 and is normally engaged with valve seat 86. So long as service brake pressure is generated in the main brake pressure line 60 of brake circuit 26, piston 84 continually urges valve 88 into engagement with valve seat 86, and normally holds the valve against that seat so long as the pressure in the pump circuit branch 82 does not exceed the pressure in the brake line 60. The passage 72 is connected with the valve chamber 90 adjacent the valve seat 86 so that when the pump pressure in branch 82 acting on the check valve 88 exceeds the pressure in brake line 60, the valve 88 is moved leftwardly as seen in the drawing, moving piston 84 with it, and opening pump circuit branch 82 to the passage 72 leading back to the reservoir. This therefore acts a pressure equalizing valve in which the pressure in the pump circuit 64 is not permitted to be greater than the pressure in the brake line 60. In order to provide such equalization, the effective area of the valve seat 86 exposed to branch 82 and the effective area of piston 84 exposed to brake line 60, are equal. It is clear that under some circumstances, should the pressures be preferred to be unequal, unequal surface areas so exposed may be provided to provide the appropriate pressure ratio.

Isolation valve 46 will now be further described and it is the same type of construction as isolation valves 32, 38 and 50. The isolation valve housing 92 is provided with a piston chamber 94 divided into a first portion 96 and a second portion 98 by a piston head 100 reciprocably received therein. A piston seal 102 on piston 100 effectively seals chamber portions 96 and 98 from each other. The piston 100 is reciprocably moveable in the chamber 94 and is continually urged by a piston spring 104 to tend to increase the volume of chamber portion 98 and decrease the volume of chamber portion 96. Chamber 94 opens into a valve bore 106 in housing 92 through a shoulder. A piston plunger 108, which may be integral with or firmly attached to piston head 100, is reciprocably and sealingly received in the valve bore 106. Seal 110 provides this the appropriate sealing action. The end of plunger 108 opposite piston 100 is provided with a reduced diameter section 112 which cooperates with a portion of valve bore 106 to provide an annular chamber 114. This chamber is continually connected to the pump circuit main line 80 by branch 116. The end of the valve bore 106 opposite the piston chamber 94 is formed to provide a valve chamber 118 having a lower valve seat 120 through which the portion of piston bore containing the piston plunger 108 opens into the valve chamber. A check valve 122 is continually urged into seating engagement with valve seat 120 by a valve spring 124, also contained in chamber 118. The second vehicle brake circuit main line 60 has a branch 126 opening into valve chamber 118 at the end thereof opposite lower valve seat 120 through an upper valve seat 123. A passage 128 connects valve chamber 118 with the solenoid operated valve inlet 130. One solenoid valve outlet 132 is connected to a passage 134, one branch 136 thereof being a brake line segment connected to the right front wheel brake 42. Passage 134 is also connected to the chamber portion 98 on the opposite side of piston 100 from chamber portion 96. Piston chamber portion 96 is connected by a branch 140 to the pump circuit main line 80. Similar branches 142, 144 and 146, are similarly connected to the isolation valves 32, 38 and 50. Likewise, pump main line branches 148, 150 and 152, corresponding to branch 116, are connected in a manner similar to branch 116 to isolation valves 32, 38 and 50. It is also here noted that branches 154 and 156 of the first circuit main line 36 are connected to isolation valves 32 and 38 in a manner similar to branch 126 of the second circuit main line 60, and branch 158 of the second circuit main line 60 is similarly connected to isolation valve 50. Likewise, passages 160 and 162 connect isolation valve 32, the valve of solenoid valve assembly 34, and the left front wheel brake 28 in a similar manner to that of passages 134 and 136 above described. Also likewise, passages 164 and 166 interconnect isolation valve 38, the valve of solenoid and valve assembly 40, and the rear right brake 30 in a manner similar to passages 134 and 136. Passages 168 and 170 similarly connect isolation valve 50, the valve of solenoid and valve assembly 52 and the left rear brake 44. Passages 172, 174, and 176 similarly connect isolation valves 32, 38 and 50 with the respectively associated valve portions of the solenoid and valve assemblies 34, 40 and 52, all in a manner similar to the connection of passage 128 between isolation valve 46 and the solenoid and valve assembly 48. Solenoid and valve assembly 48 has another valve outlet 178 connected to a passage 180 leading to a reservoir which may be the reservoir 16 of the master cylinder 10 or may be a separate reservoir. Similar passages 182, 184 and 186 respectively connect solenoid and valve assemblies 34, 40 and 52 to reservoir.

Figures 1, 1A:
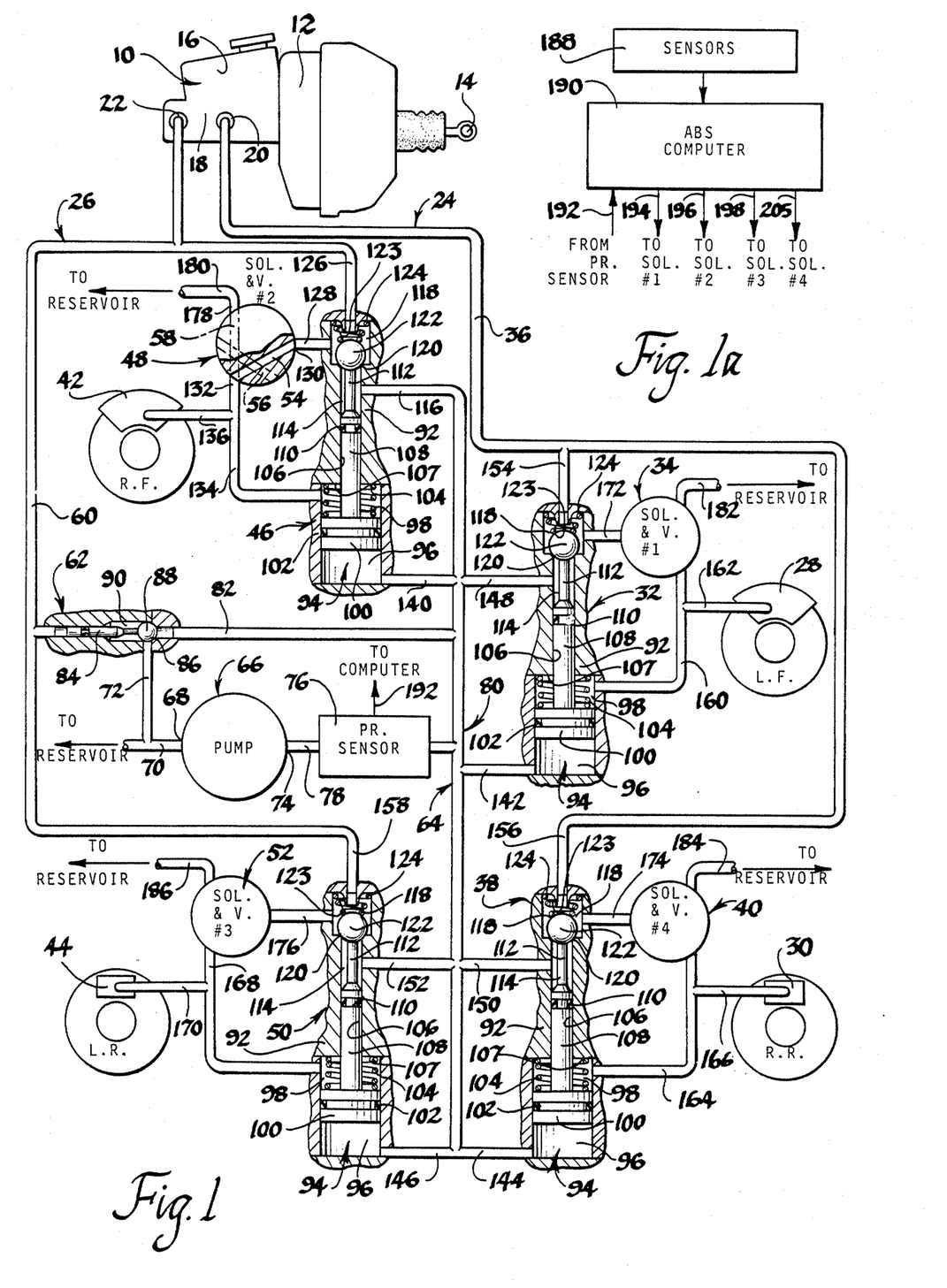
FIG. 1 is a schematic representation, with some components being broken away and in section, illustrating a first wheel lock control system embodying the invention.
FIG. 1a is a schematic representation showing the wheel lock control or Anti-Block System (ABS) computer and sensor arrangement and its connections to and from the system of the invention.
Figures 2, 2A:
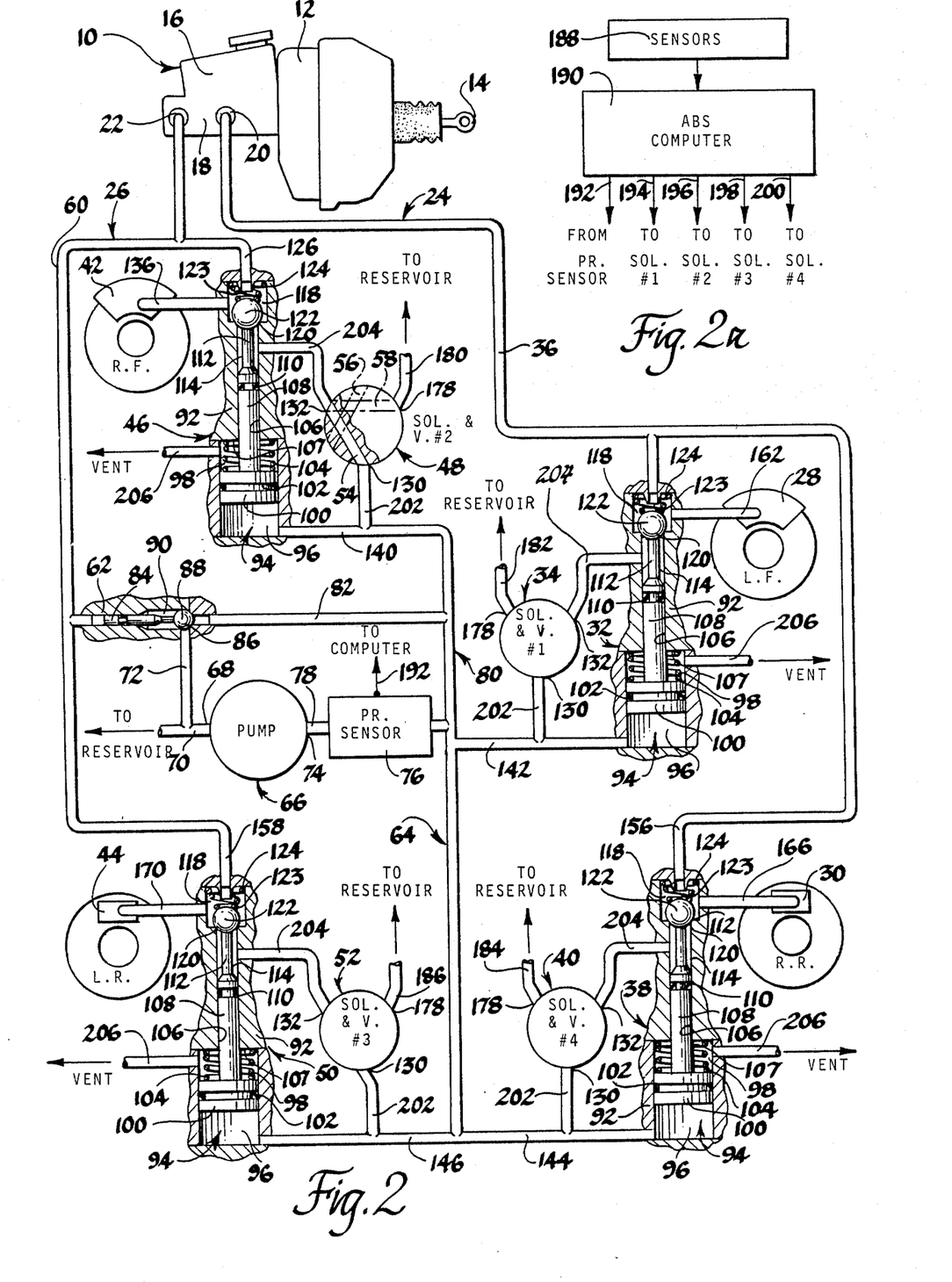
FIG. 2 is a schematic representation of another arrangement embodying the invention in a vehicle wheel lock control system as a part of a vehicle brake system, with parts broken away and in section.
FIG. 2a is similar to FIG. 1a and schematically illustrates the sensor and computer arrangement and connections to and from the system of FIG. 2.
Figures 3, 3A:
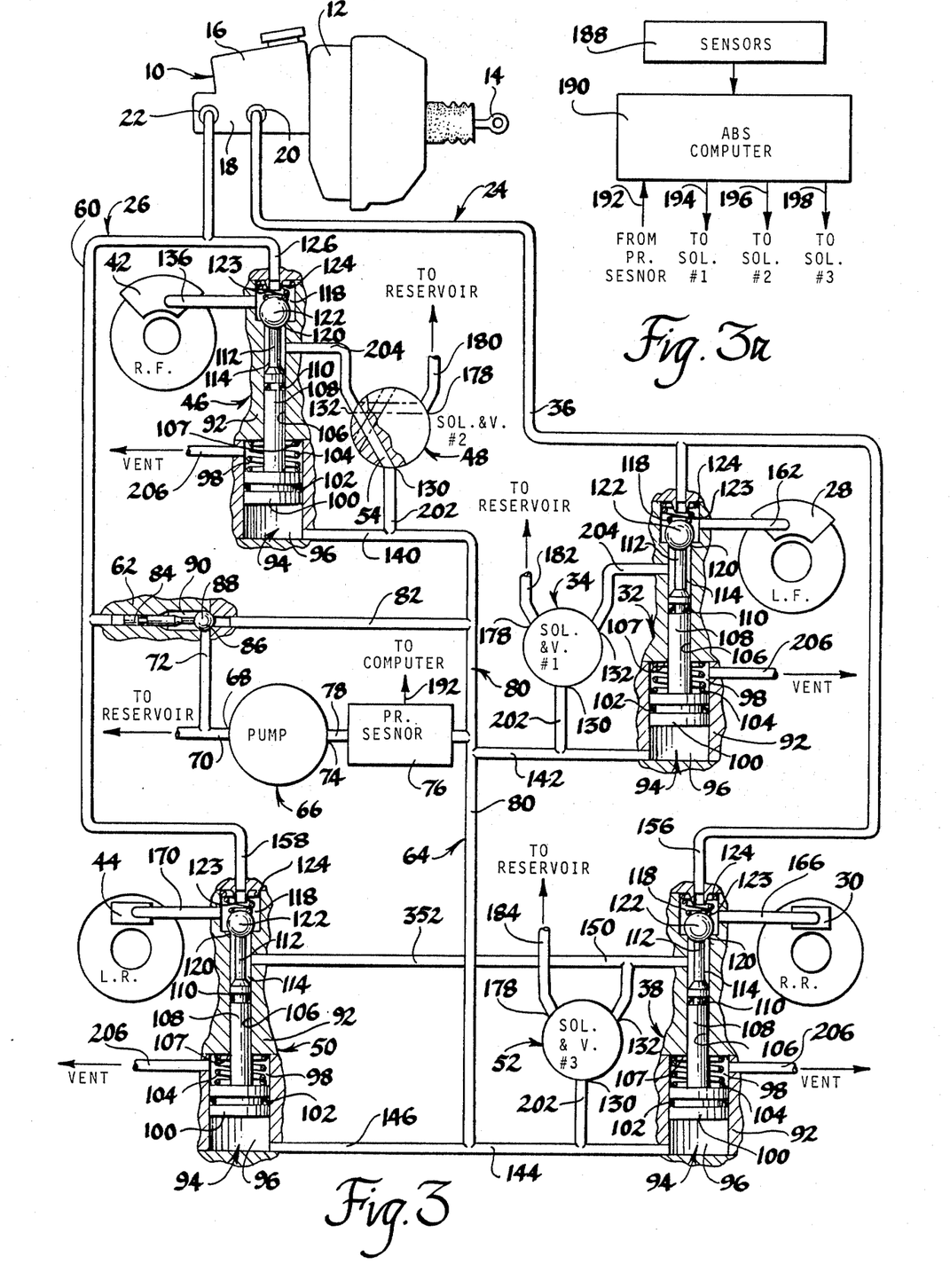
FIG. 3 is another embodiment of the invention schematically illustrating the vehicle brake system and the wheel lock control system portion thereof, with parts broken away and in section.
FIG. 3a is similar to FIGS. 1a and 2a and shows the sensor and computer connections to and from the system of FIG. 3.
Figures 4, 4A:
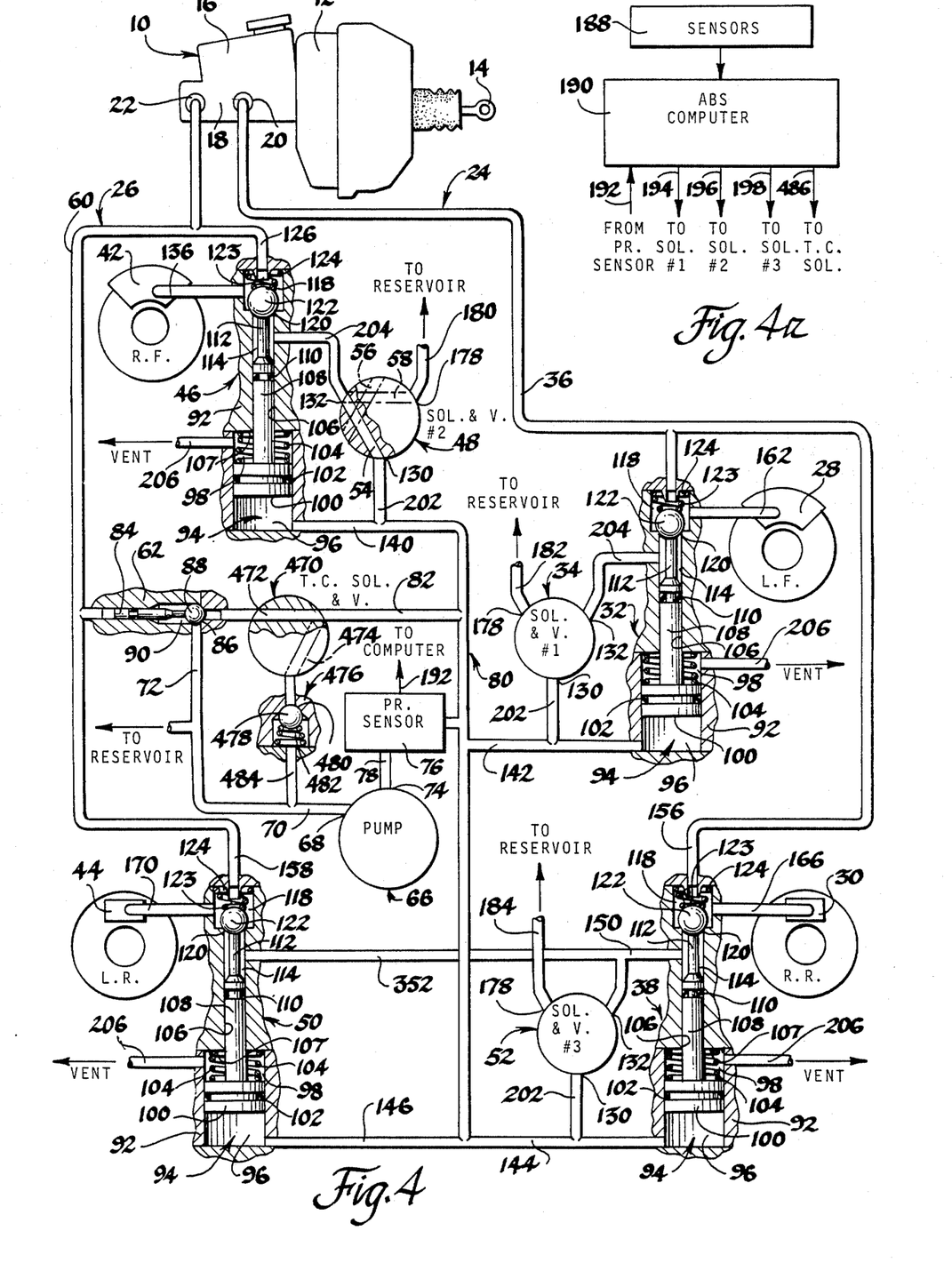
FIG. 4 is a system similar to that of FIG. 3 but also incorporating a traction control arrangement of the type that may be incorporated in the systems of FIGS. 1 and 2 as well. Parts are illustrated as being broken away and in section.
FIG. 4a is similar to FIG. 3a and illustrates the sensor and computer connections as they are connected to and from the system of FIG. 4.

FIG. 1a is a schematic illustration of the electrical and electronic control system for operating the wheel lock control system of FIG. 1, and is similar to the control arrangements shown in FIGS. 2a, 3a and 4a. In each instance, appropriate sensors 188 sense various wheel conditions and brake conditions which may include by way of example, wheel speed, wheel acceleration, wheel deceleration, vehicle lateral acceleration and deceleration, road grade, pressures in various parts of the entire vehicle braking system, or any of these or other similar conditions considered appropriate to provide signals to the ABS computer 190 for wheel lock control purposes or in the instance of FIG. 4a, also to include traction control arrangements and signals. The computer 190 is schematically illustrated as receiving a signal 192 from the pressure sensor 76, and sending signals 194, 196, 198 and 200 to the solenoid portions of the solenoid and valve assemblies Nos. 1, 2, 3 and 4, further identified respectively in the drawings as assemblies 34, 48, 52 and 40. It also sends start and stop signals to pump and motor assembly 66. The computer 190 contains appropriate algorithms and other controls to operate the wheel lock control system of FIGS. 1, 2, and 3, as well as the wheel lock control and traction control system in FIG. 4, as appropriate. The details of the electronics contained in sensors 188 and computer 190 are not a part of this invention in any detail, being otherwise provided and the subject of separate inventions. Insofar as the invention herein disclosed and claimed is concerned, it is sufficient to be aware, as those skilled in the art are, that the computer will receive appropriate signals and will generate appropriate signals to operate the systems connected thereto as described.

Since the solenoid and valve assemblies, the isolation valve assemblies, the pressure equalizing valve assembly, the pump and motor assembly and the pressure sensor are substantially identical in each of FIGS. 2, 3 and 4, only with certain connections being differently provided in some instances, and with the solenoid and valve assembly No. 3 being omitted in FIGS. 3 and 4 with appropriate different fluid passage arrangements, the same reference numerals are provided on these assemblies wherever possible as well as the same reference numerals for the various fluid pressure lines, passages and branches so long as they are connected in the same manner that they are connected in FIG. 1.

In the system of FIG. 1, normal vehicle service braking is obtained by actuation of the booster and master cylinder pressurizing circuits 24 and 26. More specifically, the brake actuating pressure in circuit 24 passes through main brake line 36 to the left front wheel brake 28 and the right rear wheel brake 30 by going through the check valve chamber 118 at the top of each associated isolation valve and then passing through the associated solenoid and valve assembly to the wheel brake. The service braking pressure is also provided in the chamber portion 98 on the upper side of the piston 100 of each isolation valve and cooperates with the force of spring 104 to prevent the piston 100 and its plunger 108 from moving upwardly to unseat the ball check valve 122 from its lower seat 120 and seat it on its upper seat 123. The pump 66 may be operated when the service brakes are applied so as to pressurize the pump circuit 64. However, the pressure in this circuit is limited by the equalizing valve assembly 62 so that it is no greater than the fluid actuating pressure in the second service braking circuit 26. It is preferred, however, that the pump be operated only when the computer sends a signal to energize one or more solenoids of the various solenoid and valve assemblies. The second service braking circuit 26 is connected in the same manner to to right front brake 42 and the left rear brake 44 through the associated isolation valves 46 and 50 and solenoid and valve assemblies 48 and 52. Since, if the pump is energized each time the brakes are applied, the pump pressure exerted under piston 100 is the same as the service brake pressure on the other side of the piston, and the force of spring 98 is sufficient, piston 100 is not moved upwardly during normal service braking operation. Thus the wheel brakes are applied and released in the usual manner. Upon release of the service brakes, the equalizer valve 62 will dump the pump pressure system to reservoir through branch 82, passage 72 and passage 70.

When the vehicle service brakes are applied and it is necessary to actuate the wheel lock control system to prevent one or more wheel brakes from locking the wheel, the following actions take place. Assuming that the right front wheel is incipiently approaching wheel lock and such condition is sensed by sensors 188, the computer control arrangement 190 sends an appropriate signal to solenoid and valve assembly No. 2. The solenoid is actuated to move the valve to a hold position which is the position illustrated by reference numeral 56 in which the valve passage 54 is disconnected from all of its inlets and outlets. It is also preferable that the pump is energized at the same time. The valve movement prevents any further increase in wheel brake pressure at wheel brake 42 even though the vehicle operator may increase the pressure in the service brake circuit main line 60. If this holding action is insufficient to prevent wheel lock, the wheel brake 42 may be released to a lower operating pressure by a further signal from the computer 190 transmitted to solenoid and valve assembly No. 2 to move the valve passage 54 to position 58, thereby connecting the passages 134 and 136 with the reservoir passage 180. This will release the pressure in the wheel brake 42, and will also release the pressure in the piston chamber portion 98. Meanwhile, pump 66 is generating and maintaining a pressure in its circuit 64 which is equal to the pressure in the secondary circuit main line 60 and that pressure is being applied to the piston chamber portion 96 of isolation valve 46 as well as chamber 114 of that isolation valve. Since the pressure has been reduced or completely released in chamber portion 98, piston 100 and its plunger 108 are moved upwardly as seen in the drawing, forcing valve 122 away from its valve seat 120 and into engagement with its upper valve seat 123, thereby closing off the service brake line 60 from the isolation valve. Therefore the master cylinder brake actuating pressure in circuit 26 is isolated from wheel brake 42. Under these conditions, wheel brake actuating pressure to brake 42 is released as above described by moving the solenoid valve to the position 58 of its passage 54. As needed and determined by the computer 190 and its algorithm, pressure can be reapplied to the wheel brake 42 from the pump pressure circuit by sending a signal to the solenoid and valve assembly No. 2 to move the valve passage 54 back to the position shown in FIG. 1. The pump pressure will then pass through the pump circuit main line 80 and branch 116, then through chamber 114 and valve seat 120 into chamber 118, then through passage 128, valve passage 54, and passages 134 and 136 to reapply the wheel brake 42. The energization and deenergization of the solenoid portion of assembly 48 is accomplished in reapply increments under control of the computer 190. Thus, for example, the brake actuating pressure actually delivered to wheel brake 42 may be increased approximately 100 p.s.i., at which time the solenoid is reenergized to move passage 54 to the hold position 56. This does not permit sufficient pump pressure to be transmitted to chamber portion 98 to recycle the isolation valve. If further brake reapply pressure is required, the computer will again cycle the solenoid and increase the brake pressure an additional amount. This assumes that the vehicle operator still has the booster and master cylinder actuated, usually to about the maximum at what is commonly referred to as panic braking. Thus the increase in brake actuating pressure at brake 42 may be held at any intermediate position or may be reduced or may be applied to a still higher pressure, eventually reaching the point where no wheel lock control operation is needed and the pump pressure, which is equal to the pressure in service brake line 60, is permitted to enter chamber 98 at a sufficiently high pressure value to cycle the isolation valve by moving piston 100 and plunger 108 downwardly so that check valve 122 is moved away from its upper seat 123 and reengages its lower seat 120. This restores service braking operation to the wheel brake 42.

The same type of operation can occur at any of the other wheel brakes 28, 30 and 44. This may occur at more than one wheel brake as needed. One particular advantage of the system of FIG. 1 is that the wheel brake pressure for each wheel brake is monitored by the associated isolation valve so that only the wheel brake actually needing to be controlled for wheel lock control purposes is cycled, thereby minimizing the load on pump 66 when the pump does not have to also act on the other wheel brakes. Of course, the pump is capable of actuating all combinations of wheel brakes in the wheel lock control mode as needed. Since the pump is preferably turned on when the first signal is sent to solenoid and valve assembly No. 2 (or any other solenoid and valve assembly) to initially establish the wheel lock control mode, and is turned off when no signal is provided thereto for a predetermined period of time, the pump upon brake release will have its output pressure decreased by the equalizing valve 62 to the pressure residing in the brake circuit main line 60 and the pump will not again be energized until wheel lock control is needed.

The system of FIG. 2 is somewhat modified in relation to that of FIG. 1 in that the solenoid and valve assemblies are located in a different connecting arrangement with the pump circuit and the isolation valves. They are primarily in a branch of the pump circuit instead of a branch of the service brake circuit. More particularly, the inlet 130 of each solenoid and valve assembly is connected by a passage 202 with the pump circuit main line 80 and the outlet 132 is connected by a passage 204 with the annular chamber 114 of each isolation valve 32, 38, 46 and 50. Therefore the passage 136 connecting isolation valve chamber 118 with wheel brake 42, and similar passages 162, 166 and 170 for the other wheel brakes, is directly connected to the isolation valve chamber 118. Piston chamber portion 98 is vented to atmosphere through vent passage 206 instead of being connected to the brake pressure circuit through the solenoid operated valve.

In normal service brake operation, as before, service brake pressure is delivered through the two brake circuit main lines 36 and 60 to the valve chamber 118 of each isolation valve and then directly to each wheel brake through the connecting passage 136 to brake 42, passage 162 to brake 28, passage 166 to brake 30, and passage 170 to brake 44. The check valve 122 of each isolation valve remains seated against its lower valve seat 120. When any sensor 188 signals to the computer that there is a need to operate the wheel lock control system, the computer will operate the appropriate solenoid and valve assembly and at the same time energize pump 66 to generate pump pressure in the pump circuit 64. The pump circuit will immediately be pressurized, to the same level as that of the service brake line 60, as will be each of the isolation valve chambers 96, immediately moving the isolation valve piston 100 and plunger 108 upwardly to move check valve 118 and into engagement with its upper seat 123. This immediately cuts off all service brake line pressure to the brakes. If only one wheel, such as the right front wheel, requires wheel lock control action, only the solenoid and valve assembly 48 will be energized to the first level to move the valve passage 54 to the hold position 56. The other solenoid and valve assemblies will remain in the same position as for service brake operation and the brakes connected therewith will be operated by pump pressure which is at the same pressure as that in the service brake main line 60 because the equalizing valve 62 keeps the pump pressure at that equal pressure. However, pump pressure is disconnected from the wheel brake 42 by the valve portion of assembly 48 so that the pressure cannot continue to increase in that brake if the vehicle operator is continuing to generate greater brake pressure by the master cylinder. If the pressure needs to be released in wheel brake 42, the solenoid portion of solenoid and valve assembly 48 is further actuated from computer 190, moving passage 54 to position 58, which releases wheel brake actuating pressure from wheel brake 42 to reservoir through passage 180. The solenoid and valve are then cycled between the release, hold and apply positions as needed in accordance with signals from computer 190 to continue wheel lock control operation as long as it is necessary. When the wheel brake pressure is permitted by the signals from the computer 190 to again reach the service brake line pressure, the solenoid operated valve of assembly 48 will return to the position shown in solid lines in the drawing so that passage 54 again connects inlet 130 and outlet 132. The brake apply pressure for wheel brake 42 will then be supplied by the pump pressure circuit, which continues to be equal to the service brake pressure in main line 60. When the operator releases the master cylinder and no service brake pressure is then in existence in circuits 24 and 26, the pump pressure also drops to that same level, releasing the pressure in chamber portion 96 and permitting the isolation valve to cycle back downwardly to the position where check valve 118 again is seated on its lower seat 120 and the isolation valve is repositioned for normal service brake operation as earlier described.

The system illustrated in FIG. 3 is similar to that of FIG. 2. However, the solenoid and valve assembly No. 3, also identified as assembly 52, is eliminated. Instead, a passage 352 connects to passage 150 of the solenoid and valve assembly No. 4, also identified as assembly 40, so that the solenoid and valve assembly 40 controls both isolation valves 46 and 50. This arrangement, instead of giving individual wheel lock control to each of the rear wheel brakes, controls both rear wheel brakes in a wheel lock control mode on a select-low basis. Therefore the sensors 188 either include a sensor acting on a drive portion relating to both rear wheels if they are drive wheels, or sense both wheels and send signals to the computer 190 which are combined to provide a select-low operation. Thus if either rear wheel requires the wheel lock control mode of operation, the solenoid and valve assembly 40 is operated and both rear wheels operate in the wheel lock control mode even though only one of them may be incipiently locking. The two front wheels are still independently controlled as in FIG. 2.

FIG. 4 is similar to FIG. 3 with added control for traction control of an appropriate wheel. The hydraulic arrangement is the same as that of FIG. 3 with a solenoid and valve assembly 470, also identified as the traction control solenoid and valve, positioned in the passage 82 between the pump main line 80 and the equalizing valve 62. The normal deenergized position position of the assembly 470 has the valve passage 472 connected to provide a continuation of passage 82 to the equalizing valve 62 as before. Passage 472 is moved upon energization of the solenoid portion of the assembly to the position shown at 474. In this position the pump pressure from pump main line 80 passing into passage 82 is disconnected from the equalizing valve 62 and is directed through a pressure relief valve assembly 476, which is schematically illustrated as being a ball check valve 478 normally held against its seat 480 by a spring 482. The preload on spring 482 is preferably set at a value which will require the pump pressure to reach a predetermined operating pressure value for operation of the brake system before being relieved. For example, this may be about 700 p.s.i. When the pump pressure exceeds the predetermined set pressure limit, valve 478 is moved away from its valve seat and the excess pressure is dumped to reservoir through passage 484 to the passage 70 leading to the reservoir so as to maintain the predetermined pump pressure.

In this arrangement, the wheel lock control system operates in the same manner as that of FIG. 3. However, when traction control is required, the system operates to apply the wheel brake on the wheel which is spinning so as to transfer power to the non-spinning drive wheel through the vehicle differential. For this purpose the sensors 188 pick up the spinning of one wheel when there is no vehicle service brake pressure being applied and send appropriate signals to computer 190. The computer determines that traction control is needed and generates the traction control signal 486 which is delivered to the traction control solenoid and valve assembly 470. This signal causes the solenoid to be energized and the valve to be moved so that passage 472 is in the position 474 illustrated in dashed lines. It also energizes pump 66 and the pump immediately builds up pressure in the pump pressurizing system. At the same time signals are sent to all of the solenoids except for the wheel requiring traction control to move the valves controlled by those solenoids to the hold position illustrated as position 56 for each passage 54. This permits the brakes other than the traction control wheel brake to be operated by the service brake pressure but not in fact being operated at this time since no brake pressure is being generated by the master cylinder. It also actuates the isolation valve associated with the wheel requiring traction control to by cycled, moving the isolation valve piston and plunger upwardly to seat the isolation valve 118 on its upper seat 123 and therefore apply pump pressure to that wheel brake through the solenoid operated valve passage 54. The slipping wheel is therefore braked and power is able to be transferred through the drive differential to the other driving wheel to generate sufficient traction to move the vehicle without spinning the braked drive wheel. When traction control is no longer needed, the computer sends appropriate signals to the solenoids to return them to the service brake position shown in the drawing.

The embodiments of the invention in which an exclusive property or privilege is claimed are defined as follows:

1. In a vehicle hydraulic brake system having a dual pressurizing chamber master cylinder, a split braking system having a first brake fluid circuit receiving pressurized brake fluid from a first master cylinder pressurizing chamber and a second brake fluid circuit receiving pressurized brake fluid from a second master cylinder pressurizing chamber, said first brake fluid circuit having therein the front left and rear right vehicle wheel brakes and said second brake fluid circuit having therein the front right and rear left vehicle wheel brakes, the improvement comprising:

a wheel lock control system having an isolation valve associated with each of said vehicle wheel brakes, first, second, third and fourth solenoid operated valves respectively associated with said front left and right vehicle wheel brakes and said rear left and right vehicle wheel brakes, a brake fluid pump and motor assembly having a pump pressurized brake fluid circuit associated with said first and second brake fluid circuits, and a pressure equalizer valve fluidly between said second brake fluid circuit and said pump pressurized brake fluid circuit;

each of said isolation valves having a stepped bore defining a piston chamber first section and a smaller diameter plunger second section separated by a shoulder and respectively receiving a headed piston and piston plunger therein for limited reciprocating movement, said headed piston and a portion of said chamber first section opposite said shoulder defining a piston pressure chamber, the other end of said chamber second section from said shoulder having an annular check valve seat and a check valve chamber containing a check valve continuously urged toward closing engagement wtih said check valve seat, a spring engaging said headed piston and said shoulder and continually urging said headed piston away from said shoulder with consequent decrease in volume of said piston pressure chamber, said piston plunger extending through said stepped chamber from said headed piston and having a reduced diameter end portion normally terminating adjacent said valve seat and said check valve when said headed piston is positioned to minimize the volume of said piston pressure chamber, said piston plunger reduced diameter end portion and a part of said chamber plunger second section cooperating to define an annular chamber adjacent said check valve seat, first passage means fluid connecting said piston pressure chamber and said annular chamber, second passage means operatively fluid connecting said check valve chamber and the one wheel brake with which each isolation valve is associated, and third passage means fluid connecting said piston chamber first section on the opposite side of said headed piston from said piston pressure chamber and the wheel brake associated with the isolation valve;

said pump pressurized brake fluid circuit being fluid connected to each of said first passage means of each of said isolation valves and to one side of said pressure equalizing valve, one of said first and second fluid braking circuits being connected to the other side of said pressure equalizing valve so that fluid pressure therein acts on said pressure equalizing valve in opposition to fluid pressure in said pump pressurized brake fluid circuit, said pressure equalizing valve having a normally closed port in fluid communication with the reservoir of said pump, said pressure equalizing valve acting when the fluid pressure in said pump pressurized brake fluid circuit exceeds the fluid pressure in said one fluid braking circuit to open said port into communication with said pump pressurized brake fluid circuit and relieve pressure therein until the fluid pressures acting on said pressure equalizing valve are substantially equal;

said first and second and third and fourth solenoid operated valves being connected in said second passage means of each of said isolation valves for each of said front wheel brakes and each of said rear wheel brakes, said solenoid operated valves having a first position fluid connecting said second passage means, a second position closing said second passage means connection with said check valve chamber and a third position opening said wheel brake to a fluid reservoir associated therewith and decreasing the brake actuating pressure acting on said wheel brake;

and control means controlling said solenoid operated valves and said pump to limit braking action of said wheel brakes and substantially prevent wheel lock during vehicle braking.

2. In a vehicle hydraulic brake system having a dual pressurizing chamber master cylinder, a split braking system having a first brake fluid circuit receiving pressurized brake fluid from a first master cylinder pressurizing chamber and a second brake fluid circuit receiving pressurized brake fluid from a second master cylinder pressurizing chamber, said first brake fluid circuit having therein the front left and rear right vehicle wheel brakes and said second brake fluid circuit having therein the front right and rear left vehicle wheel brakes, the improvement comprising:

a wheel lock control system having an isolation valve associated with each of said vehicle wheel brakes, first, second and third solenoid operated valves, said first and second solenoid operated valves being respectively associated with said front left and right vehicle wheel brakes and said third solenoid operated valve being associated with at least one of said rear left and rear right vehicle wheel brakes, a brake fluid pump and motor assembly having a pump pressurized brake fluid circuit associated with said first and second brake fluid circuits and said isolation valves and said solenoid operated valves, a pressure equalizing valve fluidly between one of said first and second brake fluid circuits and said pump pressurized brake fluid circuit for preventing the pressure in said pump pressurized brake fluid circuit from exceeding the pressure in said one brake fluid circuit, and control means receiving sensed wheel and brake condition signals and generating control signals delivered to said solenoid operated valves for controlled actuation thereof to control braking of said wheel brakes and prevent wheel lock when the vehicle brake system is actuated and one or more vehicle wheels approaches a wheel lock condition;

each of said isolation valves having a stepped bore defining a piston chamber first section and a smaller diameter plunger second section separated by a shoulder and respectively receiving a headed piston and piston plunger therein for limited reciprocating movement, said headed piston and a portion of said chamber first section opposite said shoulder defining a piston pressure chamber, the other end of said chamber second section from said shoulder having an annular check valve seat and a check valve chamber containing a check valve continuously urged toward closing engagement with said check valve seat, a spring engaging said headed piston and said shoulder and continually urging said headed piston away from said shoulder with consequent decrease in volume of said piston pressure chamber, said piston plunger extending through said stepped chamber from said headed piston and having a reduced diameter end portion normally terminating adjacent said valve seat and said check valve when said headed piston is positioned to minimize the volume of said piston pressure chamber, said piston plunger reduced diameter end portion and a part of said chamber plunger second section cooperating to define an annular chamber adjacent said check valve seat, first passage means fluid connecting to said pump pressurizing brake fluid circuit and fluid connecting said piston pressure chamber and said annular chamber, second passage means operatively fluid connecting said check valve chamber and the wheel brake with which each isolation valve is associated, and third passage means fluid connecting said piston chamber first section on the opposite side of said headed piston from said piston pressure chamber and the wheel brake associated with the isolation valve, said solenoid operated valves being connected in said second passage means of the respective ones of said isolation valves associated therewith;

said first and second solenoid operated valves each acting independently upon receipt of appropriate control signals from said control means to cause the isolation valve associated therewith to disconnect said respective left front and right front wheel brakes from further pressurization by said master cylinder, to decrease the pressure acting on said respective left front and right front wheel brakes and thus decrease the braking effort thereof, to connect said respective left front and right front wheel brakes with pressurized brake fluid in said pump pressurized brake fluid circuit and thus increase the braking effort of said respective left front and right front wheel brakes, cycling the decrease and holding and increase of left front and right front wheel brakes to maintain substantially maximum braking effort at each wheel associated therewith while preventing wheel lock, and further acting to reconnect said respective left front and right front wheel brakes for pressurization by said master cylinder for service braking;

and said third solenoid operated valve acting upon receipt of appropriate control signals from said control means to cause the isolation valves associated with the associated at least one of said left and right rear wheel brakes to disconnect the associated at least one of said left and right rear wheel brakes from further pressurization by said master cylinder, to decrease the pressure acting on the associated at least one of said left rear and right rear wheel brakes and thus decrease the braking effort thereof, to connect the associated at least one of said left rear and right rear wheel brakes with pressurized brake fluid in said pump pressurized brake fluid circuit and thus increase the braking effort of the associated at least one of said left rear and right rear wheel brakes, cycling the decrease and holding and increase of the associated at least one of said left rear and right rear wheel brakes to maintain substantially maximum braking effort of the lower maximum braking effort wheel at each wheel associated therewith while preventing wheel lock, and further acting to reconnect the associated at leasat one of said left rear and right rear wheel brakes for pressurization by said master cylinder for service braking.

3. In a vehicle hydraulic brake system having a dual pressurizing chamber master cylinder, a split braking system having a first brake fluid circuit receiving pressurized brake fluid from a first master cylinder pressurizing chamber and a second brake fluid circuit receiving pressurized brake fluid from a second master cylinder pressurizing chamber, said first brake fluid circuit having therein the front left and rear right vehicle wheel brakes and said second brake fluid circuit having therein the front right and rear left vehicle wheel brakes, the improvement comprising:

a wheel lock and traction control system having an isolation valve associated with each of said vehicle wheel brakes, first, second and third solenoid operated valves, said first and second solenoid operated valves being respectively associated with said front left and right vehicle wheel brakes and said third solenoid operated valve being associated with said rear left and rear right vehicle wheel brakes, a brake fluid pump and motor assembly having a pump inlet connected with a pump fluid reservoir and a pump outlet connected to a pump pressurized brake fluid circuit associated with said first and second brake fluid circuits and said isolation valves and said solenoid operated valves, a pressure equalizer valve fluidly between one of said first and second brake fluid circuits and said pump pressurized brake fluid circuit for preventing the pressure in said pump pressurized brake fluid circuit from exceeding the pressure in said one brake fluid circuit by dumping excess pump pressurized brake fluid to said pump fluid reservoir, a fourth solenoid operated valve connected with said pump pressurized brake fluid circuit and said equalizing valve and said pump fluid reservoir, a pressure-limiting valve between said fourth solenoid operated valve and said pump fluid reservoir, said fourth solenoid operated valve normally directing pressurized fluid in said pump pressurized brake fluid circuit therethrough to said equalizer valve and fluidly disconnecting said pressure-limiting valve from said pump pressurized brake fluid circuit but when energized disconnecting said equalizer valve from said pump pressurized brake fluid circuit and connecting said pump pressurized brake fluid circuit to said pressure-limiting valve and thence to said pump fluid reservoir when said pressure-limiting valve is opened by and at a predetermined pressure in said pump pressurized brake fluid circuit sufficient to operate the wheel brakes, and control means receiving sensed wheel and brake condition signals and generating control signals delivered to said solenoid operated valves for controlled actuation thereof to control braking of said wheel brakes and, when wheel lock is incipient, prevent wheel lock when the vehicle brake system is actuated and one or more vehicle wheels approaches a wheel lock condition;

said first and second solenoid operated valves each acting independently upon receipt of appropriate wheel lock control signals from said control means to cause the isolation valve associated therewith to disconnect said respective left front and right front wheel brakes from further pressurization by said master cylinder, to decrease the pressure acting on said respective left front and right front wheel brakes and thus decrease the braking effort thereof, to connect said respective left front and right front wheel brakes with pressurized brake fluid in said pump pressurized brake fluid circuit and thus increase the braking effort of said respective left front and right front wheel brakes, cycling the decrease and holding and increase of left front and right front wheel brakes to maintain substantially maximum braking effort at each wheel associated therewith while preventing wheel lock, and further acting to reconnect said respective left front and right front wheel brakes for pressurization by said master cylinder for service braking;

said third solenoid operated valve acting upon receipt of appropriate wheel lock control signals from said control means to cause the isolation valves associated with said left and right rear wheel brakes to disconnect said left and right rear wheel brakes from further pressurization by said master cylinder, to decrease the pressure acting on said respective left rear and right rear wheel brakes and thus decrease the braking effort thereof, to connect said respective left rear and right rear wheel brakes with pressurized brake fluid in said pump pressurized brake fluid circuit and thus increase the braking effort of said respective left rear and right rear wheel brakes, cycling the decrease and holding and increase of left rear and right rear wheel brakes to maintain substantially maximum braking effort of the lower maximum braking effort wheel at each wheel associated therewith while preventing wheel lock, and further acting to reconnect said left rear and right rear wheel brakes for pressurization by said master cylinder for service braking;

and said fourth solenoid operated valve acting upon receiving a traction control signal from said control means to disconnect said pump pressurized brake fluid circuit from said pressure equalizing valve and connect it to said pressure-limiting valve and said traction control signal from said control means also being operable to actuate said pump, said pump then increasing pressure in said pump pressurized brake fluid circuit to the predetermined pressure set by said pressure-limiting valve, said control means actuating appropriate ones of said first, second and third solenoid operated valves to cause the wheel brake of the appropriate wheel to be actuated for traction control by pump pressure in said pump pressurized fluid circuit.

4. In a vehicle hydraulic brake system having a dual pressurizing chamber master cylinder, a split braking system having a first brake fluid circuit receiving pressurized brake fluid from a first master cylinder pressurizing chamber and a second brake fluid circuit receiving pressurized brake fluid from a second master cylinder pressurizing chamber, said first brake fluid circuit having therein the front left and rear right vehicle wheel brakes and said second brake fluid circuit having therein the front right and rear left vehicle wheel brakes, the improvement comprising:

a wheel lock control system having an isolation valve associated with each of said vehicle wheel brakes, a plurality of solenoid operated valves including first, second and third solenoid operated valves, said first and second solenoid operated valves being respectively associated with said front left and right vehicle wheel brakes and said third solenoid operated valve being associated with at least one of said rear left and rear right vehicle wheel brakes, a brake fluid pump and motor assembly having a pump pressurized brake fluid circuit associated with said first and second brake fluid circuits and said isolation valves and said solenoid operated valves, a pressure equalizer valve fluidly between one of said first and second brake fluid circuits and said pump pressurized brake fluid circuit for preventing the pressure in said pump pressurized brake fluid circuit from exceeding the pressure in said one brake fluid circuit, and control means receiving sensed wheel and brake condition signals and generating control signals delivered to said solenoid operated valves for controlled actuation thereof to control braking of said wheel brakes and prevent wheel lock when the vehicle brake system is actuated and one or more vehicle wheels approaches a wheel lock condition;

each of said isolation valves having a stepped bore defining a piston chamber first section and a smaller diameter plunger second section separated by a shoulder and respectively receiving a headed piston and piston plunger therein for limited reciprocating movement, said headed piston and a portion of said chamber first section opposite said shoulder defining a piston pressure chamber, the other end of said chamber second section from said shoulder having an annular check valve seat and a check valve chamber containing a check valve continuously urged toward closing engagement with said check valve seat, a spring engaging said headed piston and said shoulder and continually urging said headed piston away from said shoulder with consequent decrease in volume of said piston pressure chamber, said piston plunger extending through said stepped chamber from said headed piston and having a reduced diameter end portion normally terminating adjacent said valve seat and said check valve when said headed piston is positioned to minimize the volume of said piston pressure chamber, said piston plunger reduced diameter end portion and a part of said chamber plunger second section cooperating to define an annular chamber adjacent said check valve seat, first passage means fluid connecting to said pump pressurizing brake fluid circuit and fluid connecting said piston pressure chamber and said annular chamber, second passage means operatively fluid connecting said check valve chamber and the wheel brake with which each isolation valve is associated, and third passage means fluid connecting said piston chamber first section on the opposite side of said headed piston from said piston pressure chamber and the wheel brake associated with the isolation valve, said solenoid operated valves being connected in said second passage means of the respective ones of said isolation valves associated therewith;

said first and second solenoid operated valves each acting independently upon receipt of appropriate control signals from said control means to cause the isolation valve associated therewith to disconnect said respective left front and right front wheel brakes from further pressurization by said master cylinder, to decrease the pressure acting on said respective left front and right front wheel brakes and thus decrease the braking effort thereof, to connect said respective left front and right front wheel brakes with pressurized brake fluid in said pump pressurized brake fluid circuit and thus increase the braking effort of said respective left front and right front wheel brakes, cycling the decrease and holding and increase of left front and right front wheel brakes to maintain substantially maximum braking effort at each wheel associated therewith while preventing wheel lock, and further acting to reconnect said respective left front and right front wheel brakes for pressurization by said master cylinder for service braking;

and said third solenoid operated valve acting upon receipt of appropriate control signals from said control means to cause at least one of the isolation valves associated with said left and right rear wheel brakes to disconnect the associated at least one of said left and right rear wheel brakes from further pressurization by said master cylinder, to decrease the pressure acting on said associated at least one of said left rear and right rear wheel brakes and thus decrease the braking effort thereof, to connect said associated at least one of said left rear and right rear wheel brakes with pressurized brake fluid in said pump pressurized brake fluid circuit and thus increase the braking effort of said associated at least one of said left rear and right rear wheel brakes, cycling the decrease and holding and increase of associated at least one of said left rear and right rear wheel brakes to maintain substantially maximum braking effort of at least the lower maximum braking effort wheel at each wheel associated therewith while preventing wheel lock, and further acting to reconnect said associated at least one of said left rear and right rear wheel brakes for pressurization by said master cylinder for service braking.

5. In a vehicle wheel brake system having a master cylinder and a plurality of vehicle wheels having pressure operated wheel brakes, at least two master cylinder fluid brake pressure output circuits with one of said circuits connected to operate certain ones of said wheel brakes and the other of said circuits connected to operate certain others of said wheel brakes, and brake fluid reservoir means for said vehicle wheel brake system, the invention comprising:

a wheel lock control system for preventing wheel lock and consequent skidding, said wheel lock control system comprising:

a plurality of isolation valves each of said isolation valves when actuated isolating at least one vehicle wheel brake from a brake master cylinder fluid brake pressure output circuit, a fluid pressure pump and motor assembly normally generating a fluid pressure in a pump supply pressure circuit equal to the fluid pressure in one of said brake master cylinder pressure output circuits, a plurality of solenoid operated valves each of which is fluid connected with at least one of said isolation valves and with said fluid reservoir means and selectively fluid connected with said pump supply pressure circuit, each of said isolation valves having a stepped bore defining a piston chamber first section and a smaller diameter plunger second section separated by a shoulder and respectively receiving a headed piston and piston plunger therein for limited reciprocating movement, said headed piston and a portion of said chamber first section opposite said shoulder defining a piston pressure chamber, the other end of said chamber second section from said shoulder having an annular check valve seat and a check valve chamber containing a check valve continuously urged toward closing engagement with said check valve seat, a spring engaging said headed piston and said shoulder and continually urging said headed piston away from said shoulder with consequent decrease in volume of said piston pressure chamber, said piston plunger extending through said stepped chamber from said headed piston and having a reduced diameter end portion normally terminating adjacent said valve seat and said check valve when said headed piston is positioned to minimize the volume of said piston pressure chamber, said piston plunger reduced diameter end portion and a part of said chamber plunger second section cooperating to define an annular chamber adjacent said check valve seat, first passage means fluid connecting to said pump pressurizing brake fluid circuit and fluid connecting said piston pressure chamber and said annular chamber, second passage means operatively fluid connecting said check valve chamber and the wheel brake with which each isolation valve is associated, and third passage means fluid connecting said piston chamber first section on the opposite side of said headed piston from said piston pressure chamber to the atmosphere, said solenoid operated valves being connected in said first passage means of the respective ones of said isolation valves associated therewith;

at least one of said solenoid operated valves being actuatable to actuate at least one of said isolation valves and to dump wheel brake actuating pressure from at least one vehicle wheel brake associated with said at least one isolation valve and thereafter control the application, hold and release of pump supply pressure to said at least one of said isolation valves, control means receiving signals responsive to sensed conditions relating to the rotational performance of the vehicle wheels and generating control signals delivered to said solenoid operated valves to actuate and release same, and pump output pressure sensing means sensing the presence of at least a predetermined pump output pressure from said pump and generating and sending a corresponding signal to said control means, said control means being prevented from generating a control signal to energize any of said solenoid operated valves to release any brake actuating pressure from any of said vehicle wheel brakes until said pump predetermined output pressure signal is received by said control means.

6. In a vehicle wheel lock control system for a vehicle wheel brake system having at least one pressure operated vehicle wheel brake and a service braking fluid brake pressure brake operating circuit operatively connected therewith, an independently driven pump fluid brake pressure generating system generating fluid brake pressure for actuating, releasing and holding the vehicle wheel brake in the wheel lock control mode, and control means for disabling operation of a vehicle wheel brake by the service braking circuit fluid brake pressure and enabling actuating, releasing and holding operation of the vehicle wheel brake by the pump-generated fluid brake pressure, the improvement comprising:

first means responsive to a signal indicating the need for establishing the wheel lock control mode to actuate said control means and including a plurality of isolation valves each of said isolation valves when actuated isolating at least one vehicle wheel brake from a brake master cylinder fluid brake pressure output circuit, and a plurality of solenoid operated valves each of which is fluid connected with at least one of said isolation valves, and second means sensing the generation of pump-generated fluid brake pressure, said second means generating another signal operatively preventing said first means for actuating said control means until the sensed pump-generated fluid brake pressure is at a predetermined fluid brake pressure sufficient to actuate, release and hold the vehicle wheel brake in the wheel lock control mode;

each of said isolation valves having a stepped bore defining a piston chamber first section and a smaller diameter plunger second section separated by a shoulder and respectively receiving a headed piston and piston plunger therein for limited reciprocating movement, said headed piston and a portion of said chamber first section opposite said shoulder defining a piston pressure chamber, the other end of said chamber second section from said shoulder having an annular check valve seat and a check valve chamber containing a check valve continuously urged toward closing engagement with said check valve seat, a spring engaging said headed piston and said shoulder and continually urging said headed piston away from said shoulder with consequent decrease in volume of said piston pressure chamber, said piston plunger extending through said stepped chamber from said headed piston and having a reduced diameter end portion normally terminating adjacent said valve seat and said check valve when said headed piston is positioned to minimize the volume of said piston pressure chamber, said piston plunger reduced diameter end portion and a part of said chamber plunger second section cooperating to define an annular chamber adjacent said check valve seat, first passage means fluid connecting to said pump pressurizing brake fluid circuit and fluid connecting said piston pressure chamber and said annular chamber, second passage means operatively fluid connecting said check valve chamber and the wheel brake with which each isolation valve is associated, and third passage means fluid connecting said piston chamber first section on the opposite side of said headed piston from said piston pressure chamber and the wheel brake associated with the isolation valve, said solenoid operated valves being connected in said second passage means of the respective ones of said isolation valves associated therewith.

7. In a vehicle wheel lock control and drive wheel traction control system for a vehicle wheel brake system having at least first and second differentially connected driven vehicle wheels, a pressure operated wheel brake for braking each of said vehicle wheels, a service braking fluid brake pressure brake operating circuit operatively connected therewith, an independently driven pump fluid brake pressure generating system generating fluid brake pressure for actuating, releasing and holding said vehicle wheel brakes in the wheel lock control mode and in the traction control mode, and control means for disabling operation of said vehicle wheel brakes by the service braking circuit fluid brake pressure and enabling actuating, releasing and holding operation of the one vehicle wheel brake by the pump-generated fluid brake pressure, the improvement comprising:

and including a plurality of isolation valves each of said isolation valves when actuated isolating at least one vehicle wheel brake from a brake master cylinder fluid brake pressure output circuit, and a plurality of solenoid operated valves each of which is fluid connected with at least one of said isolation valves;

each of said isolation valves having a stepped bore defining a piston chamber first section and a smaller diameter plunger second section separated by a shoulder and respectively receiving a headed piston and piston plunger therein for limited reciprocating movement, said headed piston and a portion of said chamber first section opposite said shoulder defining a piston pressure chamber, the other end of said chamber second section from said shoulder having an annular check valve seat and a check valve chamber containing a check valve continuously urged toward closing engagement with said check valve seat, a spring engaging said headed piston and said shoulder and continually urging said headed piston away from said shoulder with consequent decrease in volume of said piston pressure chamber, said piston plunger extending through said stepped chamber from said headed piston and having a reduced diameter end portion normally terminating adjacent said valve seat and said check valve when said headed piston is positioned to minimize the volume of said piston pressure chamber, said piston plunger reduced diameter end portion and a part of said chamber plunger second section cooperating to define an annular chamber adjacent said check valve seat, first passage means fluid connecting to said pump pressurizing brake fluid circuit and fluid connecting said piston pressure chamber and said annular chamber, second passage means operatively fluid connecting said check valve chamber and the wheel brake with which each isolation valve is associated, and third passage means fluid connecting said piston chamber first section on the opposite side of said headed piston from said piston pressure chamber to the atmosphere, said solenoid operated valves being connected in said first passage means of the respective ones of said isolation valves associated therewith;

first means responsive to a signal indicating the need for establishing the wheel lock control mode to actuate said control means;

second means sensing the generation of pump-generated fluid brake pressure, said second means generating another signal operatively preventing said first means from actuating said control means until the sensed pump-generated fluid brake pressure is at a predetermined fluid brake pressure sufficient to actuate, release and hold the vehicle wheel brakes in the wheel lock control and traction control modes;

third means responsive to a traction control signal indicating the need for establishing the traction control mode to actuate said control system in the traction control mode, said third means including valve means establishing a pressure build-up capability and a pressure limit for said pump-generated fluid brake pressure which is sufficient to disable operation of the vehicle wheel brakes by the service braking circuit fluid brake pressure without said master cylinder having been actuated and to actuate one of said vehicle driven wheel brakes by pump-generated fluid brake pressure under control of said control means, said control means being responsive to said traction control signal to cause application of said pump-generated fluid brake pressure to the one driven vehicle wheel brake and actuate same to decrease the rotational speed of the one driven vehicle wheel and permit driving force to be directed to the other driven vehicle wheel.

* * * * *